(No Model.)
W. C. LOOKER & J. NEWLOVE.
PLUMB LEVEL.
No. 377,396. Patented Feb. 7, 1888.
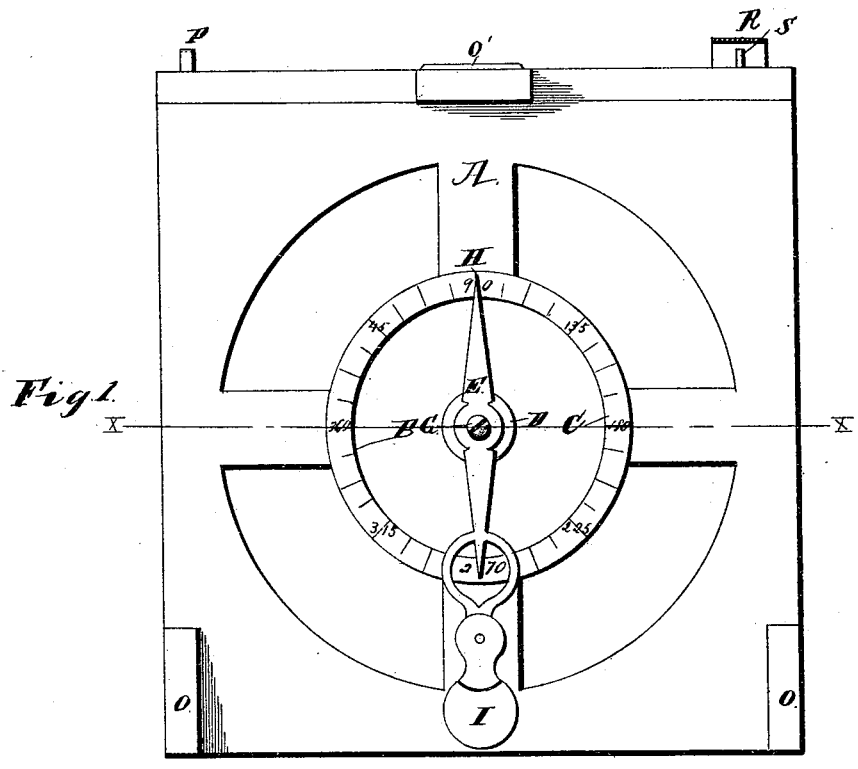
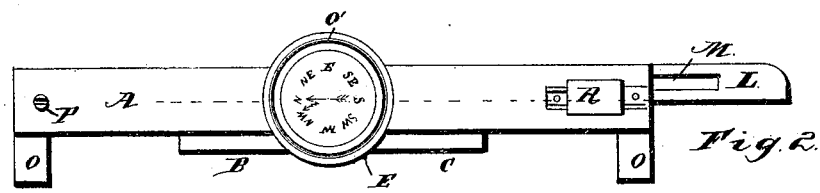
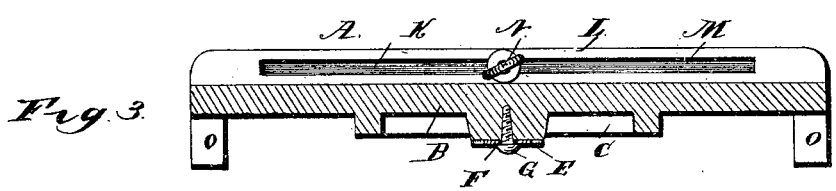
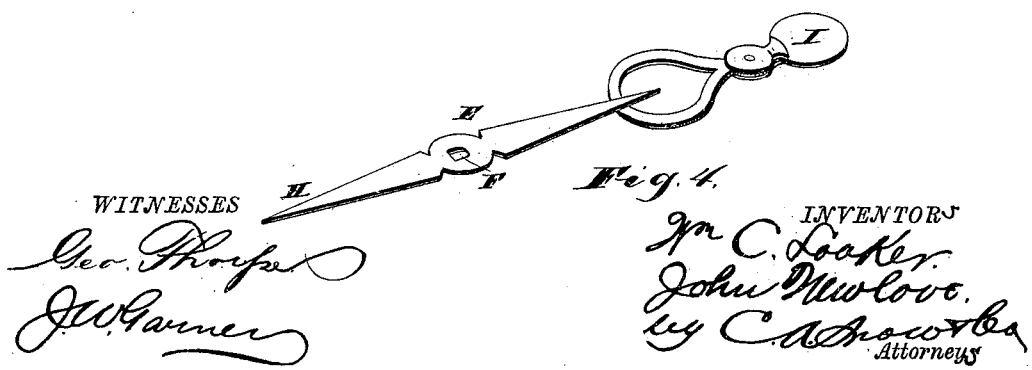
WITNESSES
Geo. Thorpe
J. W. Garner
INVENTORS
Wm. C. Looker
John Newlove
by C. A. Snow & Co.
Attorneys

UNITED STATES PATENT OFFICE.

WILLIAM C. LOOKER AND JOHN NEWLOVE, OF UNION MILLS, INDIANA.

PLUMB-LEVEL.

SPECIFICATION forming part of Letters Patent No. 377,396, dated February 7, 1888.

Application filed May 20, 1887. Serial No. 238,897. (No model.)

*To all whom it may concern:*

Be it known that we, WILLIAM C. LOOKER and JOHN NEWLOVE, citizens of the United States, residing at Union Mills, in the county of La Porte and State of Indiana, have invented a new and useful Improvement in a Combination Square, Level, Plumb, and Compass, of which the following is a specification.

Our invention relates to an improvement in combination-tools; and it consists in the peculiar construction and combination of devices, that will be more fully set forth hereinafter, and particularly pointed out in the claim.

The object of our invention is to provide a combination square, level, and plumb to be used by carpenters, masons, ditchers, and others, and which shall be cheap and adapted to be packed in a small space and readily carried about.

Figure 1 is a side elevation of a combination implement embodying our improvements. Fig. 2 is a top plan view of the same. Fig. 3 is a horizontal section taken on the line $x$ $x$ of Fig. 1. Fig. 4 is a detail view.

A represents a plate or frame, which is perfectly square. In the center of the square base-plate is formed a circular disk, B, provided with a raised annular flange, C, and with a central projecting boss, D. The flange C is inscribed with a graduated scale, indicating the degrees and subdivisions thereof in a circle.

E represents an arm, which is provided near its center with an opening, F, the upper side of which is square. Through the said opening extends a pivotal screw, G, which serves to connect the arm to the outer end of the central boss. The upper end of the arm is fashioned into an index or pointer, H, which is adapted to sweep over the graduated scale on the annular flange C, and the lower end of the said arm, which is longer than the arm H, projects beyond the flange C.

I represents a weight, which is pivoted to the lower end of the arm E and forms a pendulum or bar, the function of which is to cause the arm to turn on its pivot when the lower side of the square frame A is placed on an inclined plane, and thereby cause the pointer to indicate on the graduated scale the exact inclination of the plane.

By making the upper side of the opening F square it will be understood that a very slight portion of the upper side of the said opening is caused to bear on the pivotal screw G, and consequently the friction is reduced to a minimum and increased sensibility is imparted to the pointer. By having the weight or bob pivoted to the lower end of the arm that depends from the pointer excessive vibration of the latter on its pivotal screw is prevented, thereby causing the pointer to speedily become quiescent when the base of the frame is applied to an inclined plane.

From one side of the lower edge of the square frame projects a lateral flange, K, on which is secured an extensible arm, L. Said arm is provided with a vertical longitudinal slot, M, through which extends a clamping-screw, N, that enters the flange K, and the function of the said screw is to secure the arm at any desired adjustment on the flange. From the opposite side of the square frame, at the lower edge thereof, projects a pair of supporting feet or brackets, O. The function of the said supporting feet or brackets and flange K is to give an increased bearing surface to the lower edge of the square frame. In the upper side of the square frame, at the center thereof, is recessed a compass, O', having a magnetic needle. From one end of the frame, at the upper side thereof, projects a stud, P, which has a longitudinal slit or kerf in its upper edge, constituting a sight. At the opposite corner of the square frame is a longitudinal sight-tube, R, in which is a vertical stud, S, the top of which is directly in line and on the same horizontal plane with the bottom of the kerf in the sight P.

The operation of our invention will be very readily understood.

The frame or plate A being a perfect square is adapted to be used by carpenters and joiners for setting window and door frames and for similar purposes, the hand on the dial serving to indicate whether the frames are "plumb" or not. When it is desired to form a square to be used for squaring a piece of timber, the thumb-screw N is loosened and the extensible arm L moved out and then secured in place by tightening the screw.

The device is also adapted for use as a plumb-level, the hand on the dial serving to indicate the angle of an object against which one side of the frame or plate is placed.

When used as a mason's tool, the compass is to enable him to get the exact parallels for laying foundations, the "sight" being taken by looking through the tube R and ranging the stud S and the bottom of kerf in the sight P in line.

To tell whether a wall is plumb or vertical, place the lower edge of the plate, having the supports O and the flange, on the top of the wall, level the instrument, placing one end thereof out even with the outer edge of the wall, and the weighted pointer or hand will indicate on the dial whether the wall is true.

Having thus described our invention, we claim—

The combination-tool comprising the square frame A, having the extensible arm L, the central circular disk having the graduated circular scale, the weighted pointer pivoted to the center of the said disk and adapted to sweep over the scale, the compass in the upper side of the square-frame, the sight P, at one of the upper corners thereof, and the tubular sight R, at the opposite upper corner thereof, said tubular sight being provided with the stud S, substantially as described.

In testimony that we claim the foregoing as our own we have hereto affixed our signatures in presence of two witnesses.

WILLIAM C. LOOKER.
JOHN NEWLOVE.

Witnesses:
R. N. BENNETT,
H. A. BENNETT.